United States Patent
Chae et al.

(10) Patent No.: US 10,816,342 B2
(45) Date of Patent: Oct. 27, 2020

(54) SYSTEM FOR GATHERING AND TRANSMITTING OBJECT DISTANCE DATA

(71) Applicant: HANWHA DEFENSE CO., LTD., Changwon-si (KR)

(72) Inventors: Hee Seo Chae, Changwon-si (KR); Yun Geun Choe, Changwon-si (KR); Jae Chan Park, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 158 days.

(21) Appl. No.: 16/193,626

(22) Filed: Nov. 16, 2018

(65) Prior Publication Data

US 2020/0041272 A1 Feb. 6, 2020

(30) Foreign Application Priority Data

Aug. 1, 2018 (KR) .................... 10-2018-0089815

(51) Int. Cl.
| | | |
|---|---|---|
| *G01C 21/20* | (2006.01) | |
| *G05B 19/406* | (2006.01) | |
| *G01S 7/00* | (2006.01) | |
| *G01S 17/89* | (2020.01) | |
| *H04N 5/232* | (2006.01) | |

(52) U.S. Cl.
CPC .......... *G01C 21/206* (2013.01); *G01S 7/003* (2013.01); *G01S 17/89* (2013.01); *G05B 19/406* (2013.01); *G05B 2219/37425* (2013.01); *H04N 5/23299* (2018.08)

(58) Field of Classification Search
CPC ....... G01C 21/206; G01S 7/003; G01S 17/89; G05B 19/406; H04N 5/23299
See application file for complete search history.

(56) References Cited

U.S. PATENT DOCUMENTS

| | | | |
|---|---|---|---|
| 7,120,445 B2 | 10/2006 | DeMarco et al. | |
| 2008/0027591 A1* | 1/2008 | Lenser ................. | G05D 1/0251 701/2 |
| 2011/0025531 A1* | 2/2011 | Geelen ................. | G09B 29/106 340/995.1 |
| 2013/0128001 A1* | 5/2013 | You ..................... | G06K 9/00208 348/47 |
| 2015/0294160 A1* | 10/2015 | Takahashi ............ | H04N 13/204 382/104 |
| 2018/0096463 A1* | 4/2018 | Kim ...................... | G06T 17/00 |
| 2019/0086932 A1* | 3/2019 | Fan ....................... | G08G 1/16 |
| 2019/0375430 A1* | 12/2019 | Emura .................. | G08G 1/00 |

FOREIGN PATENT DOCUMENTS

| | | |
|---|---|---|
| JP | 2007-242056 A | 9/2007 |
| KR | 10-0977514 B1 | 8/2010 |
| KR | 10-2013-0068248 A | 6/2013 |

\* cited by examiner

*Primary Examiner* — Hussein Elchanti
(74) *Attorney, Agent, or Firm* — Sughrue Mion, PLLC (57) ABSTRACT

Provided is a map generation system including a vehicle such as a robot and a remote control apparatus, wherein the vehicle includes a distance sensor configured to output object-distance data; and a processor configured to transmit to the remote control apparatus the object-distance data excluding a portion of data about object-distances which are shorter than a predetermined object-distance, and the remote control apparatus is configured to generate a map based on the object-distance data received from the processor.

19 Claims, 7 Drawing Sheets

SYSTEM FOR GATHERING AND TRANSMITTING OBJECT DISTANCE DATA

CROSS-REFERENCE TO THE RELATED APPLICATION

This application claims priority from Korean Patent Application No. 10-2018-0089815, filed on Aug. 1, 2018, in the Korean Intellectual Property Office, the disclosure of which is incorporated herein in its entirety by reference.

BACKGROUND

Apparatuses and methods consistent with exemplary embodiments of the inventive concept relate to a data gathering and transmission vehicle and its controller, and more particularly, to an interior-map generation system for generating an interior map using object-distance data gathered and transmitted by an interior exploration robot.

A global positioning system (GPS) using navigation satellites cannot operate in interior environments such as caves, tunnels, underground facilities, etc. Accordingly, there is a demand for an interior-map generation system which generates an interior map through an interior exploration robot.

In an interior-map generation system, a distance sensor is installed in an interior exploration robot, and the interior exploration robot transmits object-distance data received from a distance sensor to a remote control apparatus thereof while traveling according to the object-distance data. Thus, the remote control apparatus generates an interior map using a simultaneous localization and mapping (SLAM) algorithm. Generally, the remote control apparatus is included in an operation control system (OCS) of the interior exploration robot.

Light Detection And Ranging (LiDAR) is used for the distance sensor of the interior exploration robot. Such a distance sensor detects object-distances and outputs object-distance data to the remote control apparatus.

As a very large amount of object-distance data is continuously transmitted to the remote control apparatus as described above, a large part of the object-distance data is lost during transmission due to a limited wireless communication environment. Accordingly, an interior map cannot be accurately generated. When a communication distance between the interior exploration robot and the remote control apparatus is short, a wireless communication environment is improved and thus a very large amount of object-distance data may be completely transmitted to the remote control apparatus.

Accordingly, an interior-map generation system according to the related art is disadvantageous in that an interior exploration range should be reduced to generate an accurate interior map.

Information disclosed in this Background section was already known to the inventors before achieving the disclosure or is technical information acquired in the process of achieving the disclosure. Therefore, it may contain information that does not form the prior art that is already known to the public in this country.

SUMMARY

One or more exemplary embodiments provide an interior-map generation system and an interior exploration robot which are capable of increasing an interior exploration range while generating an accurate interior map.

Various aspects of the inventive concept will be set forth in part in the description which follows and, in part, will be apparent from the description, or may be learned by practice of the presented embodiments.

In an interior-map generation system according to one or more embodiments, a remote control apparatus of an interior exploration robot generates an interior map according to object-distance data received from a distance sensor installed in the interior exploration robot. The interior exploration robot transmits the object-distance data from the distance sensor to the remote control apparatus, excluding a portion of data among data of object-distances which are shorter than a predetermined object-distance.

The distance sensor measures a distance by using a reflection time of light or radio waves. Thus, the density of data of a relatively short object-distance is higher than that of data of a relatively long object-distance. Accordingly, an accurate interior map may be generated even when the density of the data of the relatively short object-distance is reduced.

In the interior-map generation system and the interior exploration robot of the one or more of the exemplary embodiments, object-distance data is transmitted, excluding a portion of data among data of object-distances which are shorter than a predetermined object-distance. Accordingly, a communication distance between the interior exploration robot and the remote control apparatus may be increased while maintaining accuracy of a generated interior map. That is, an interior exploration range may be increased while generating an accurate interior map.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

All embodiments described herein are exemplary, and the following description and the drawings are not intended to restrict the scope of the inventive concept, which should be defined at least by the appended claims. The terms used herein should be interpreted as having meanings and concepts that are consistent with the technical idea of the disclosure, so that the disclosure may be most appropriately understood.

An embodiment provided in the following description is not excluded from being associated with one or more features of another example or another embodiment also provided herein or not provided herein but consistent with the inventive concept. For example, even if matters described in a specific example are not described in a different example thereto, the matters may be understood as being related to or combined with the different example, unless otherwise mentioned in descriptions thereof.

Figure 1:
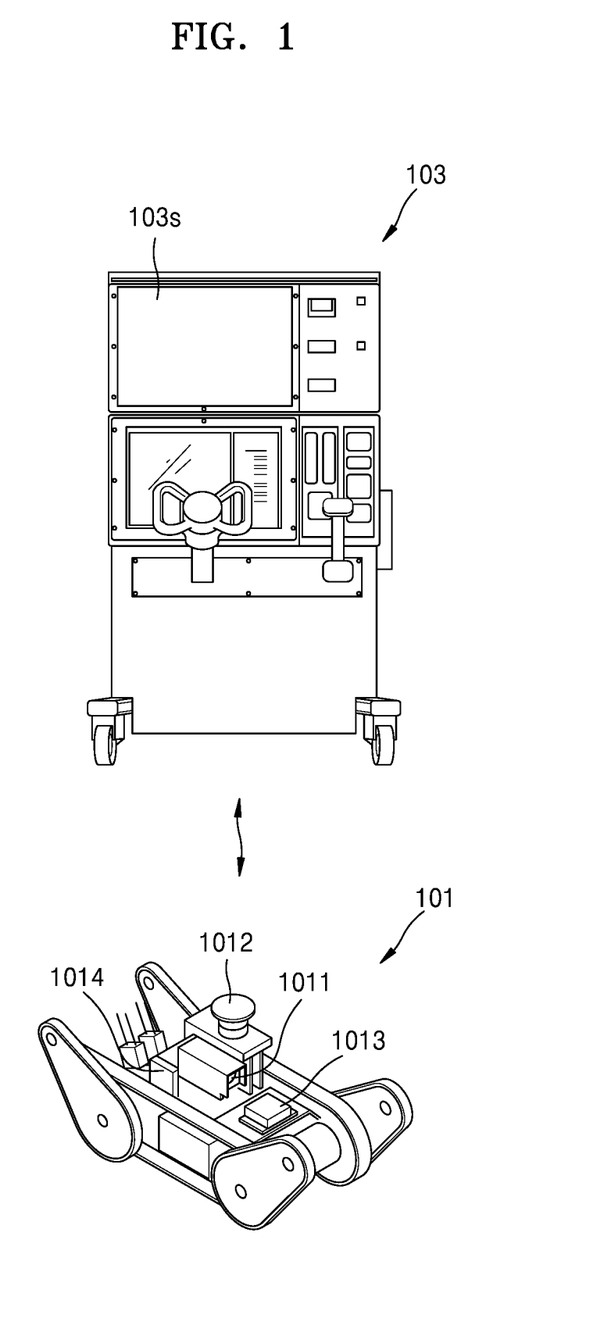
FIG. 1 is a diagram illustrating an interior-map generation system according to a first exemplary embodiment.

FIG. 1 illustrates an interior-map generation system according to a first embodiment.

Referring to FIG. 1, the interior-map generation system includes an interior exploration robot 101, and a remote control apparatus 103 which is constituted by a display panel 103s, a camera 1011, a distance sensor 1012, a global positioning system (GPS) receiver 1013, and a processor 1014.

The interior exploration robot 101 which explores an interior to generate an interior map transmits object-distance data received from the distance sensor 1012 to the remote control apparatus 103 while traveling according to the object-distance data. Thus, the remote control apparatus 103 generates an interior map by using a simultaneous localization and mapping (SLAM) algorithm.

In the present embodiment, Light Detection And Ranging (LiDAR) is used for the distance sensor 1012 of the interior exploration robot 101. The distance sensor 1012 outputs object-distance data of different heights for each channel regarding each scan point while panning and tilting.

The distance sensor 1012 performs scanning 600,000 times per second for each channel. Thus, a 32-channel distance sensor may transmit up to 19.2 million pieces of object-distance data per second to the remote control apparatus 103. However, the distance sensor 1012 using LiDAR measures a distance by using a light reflection time. Thus, the density of data of a relatively short object-distance is higher than that of data of a relatively long object-distance. Accordingly, an accurate interior map may be generated even when the density of the data of the relatively short object-distance is reduced.

In the interior-map generation system and the interior exploration robot 101 according to the present embodiment, object-distance data is transmitted, excluding a preset number of pieces of data among data about object-distances which are shorter than a predetermined object-distance. Thus, a communication distance between the interior exploration robot 101 and the remote control apparatus 103 may be increased while maintaining accuracy of the generated interior map. That is, an interior exploration range may be increased while generating an accurate interior map.

The predetermined object-distance and the preset number may be appropriately set according to characteristics of various types of interior-map generation systems and various exploration environments, and thus, it is difficult to provide preferable values thereof. In the present embodiment, the object-distance data is transmitted, excluding the preset number of pieces of data among data about object-distances which are shorter than the predetermined object-distance, e.g., 15 meters. A technique related to the preset number and the predetermined number will be described in detail with reference to FIGS. 6 and 7 below.

Figure 2:
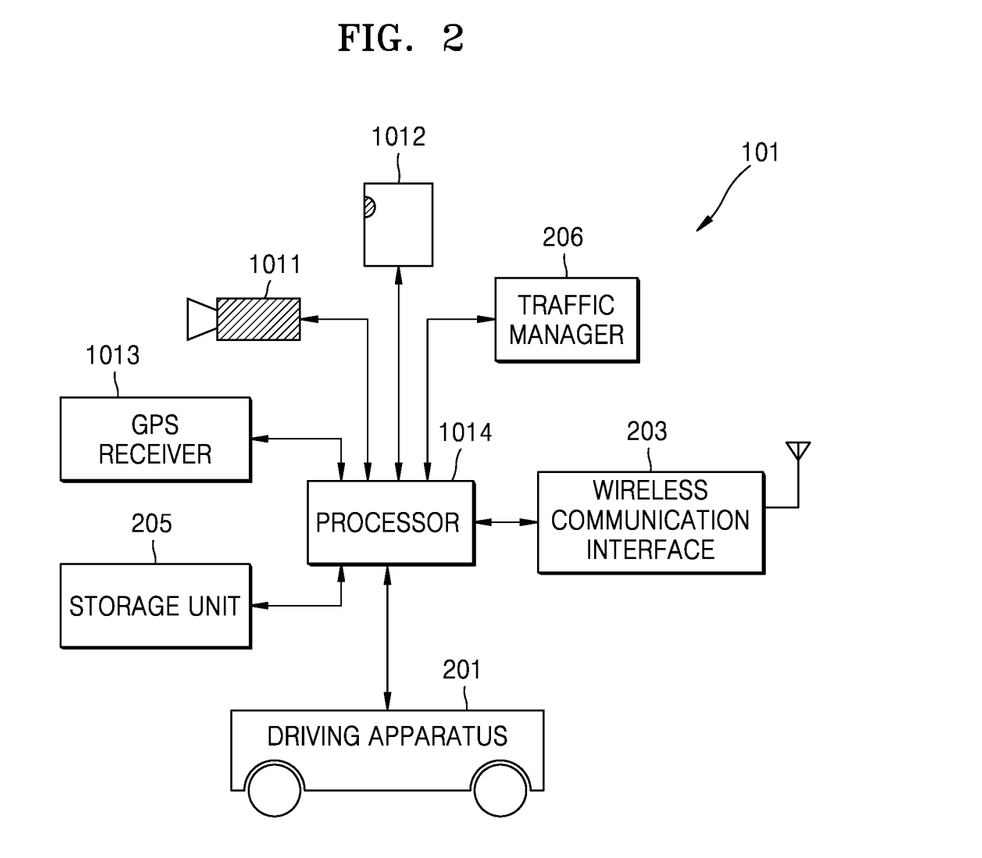
FIG. 2 is a diagram illustrating a structure of an interior exploration robot of FIG. 1, according to an exemplary embodiment.

FIG. 2 illustrates a structure of the interior exploration robot 101 of FIG. 1.

Referring to FIGS. 1 and 2, the interior exploration robot 101 includes the camera 1011, the distance sensor 1012, the GPS receiver 1013, the processor 1014, a driving apparatus 201, a wireless communication interface 203, a storage 205, and a traffic manager 206.

The driving apparatus 201 operated by the processor 1014 performs panning and tilting of the camera 1011 and the distance sensor 1012 while the interior exploration robot moves around.

The wireless communication interface 203 operates as an input/output interface when the processor 1014 communicates with the remote control apparatus 103, and may include any one or any combination of a digital modem, a radio frequency (RF) modem, a WiFi chip, and related software and/or firmware.

The GPS receiver 1013 provides current location information to the processor 1014.

The storage 205 stores various types of data received from the processor 1014, and may include at least one memory such as random access memory (RAM), read-only memory (ROM), flash memory, not being limited thereto.

The traffic manager 206 operated by the processor 1014 monitors a Received Signal Strength Indicator (RSSI) of a signal received from a communication target, e.g., the remote control apparatus 103. The traffic manager 206 may be embodied as various numbers of hardware, software and/or firmware structures that execute the foregoing monitoring function.

The processor 1014 controls overall operations of the other components, and transmits data received from the camera 1011 and the distance sensor 1012 to the remote control apparatus 103 via the wireless communication interface 203. The processor 1014 may include a central processing unit (CPU) that performs functions of the processor 1014.

The camera 1011 operated by the processor 1014 performs image capturing while panning and tilting. Data of a live-view image from the camera 1011 is transmitted for monitoring performed by a user but is not needed to generate an interior map. Thus, for smooth wireless communication, the processor 1014 significantly reduces the amount of the data of the live-view image from the camera 1011 and transmits the resultant data to the remote control apparatus 103.

The distance sensor 1012 operated by the processor 1014 outputs object-distance data of different heights for each channel regarding each scan point while panning and tilting. In the present embodiment, the distance sensor 1012 which is a 32-channel distance sensor performs scanning 600,000 times per second for each channel. Accordingly, up to 19.2 million pieces of object-distance data per second is input to the processor 1014.

However, the distance sensor 1012 using LiDAR measures a distance by using a light reflection time. Thus, the density of data of a relatively short object-distance is higher than that of data of a relatively long object-distance. Accordingly, an accurate interior map may be generated even when the density of the data of the relatively short object-distance is reduced.

Accordingly, the processor 1014 transmits to the remote control apparatus 103 object-distance data of each channel excluding a preset number of pieces of data among data about object-distances which are shorter than a predetermined object-distance. Thus, a communication distance between the interior exploration robot 101 and the remote control apparatus 103 may be increased while maintaining accuracy of a generated interior map. That is, an interior exploration range may be increased while generating an accurate interior map.

Figure 3:
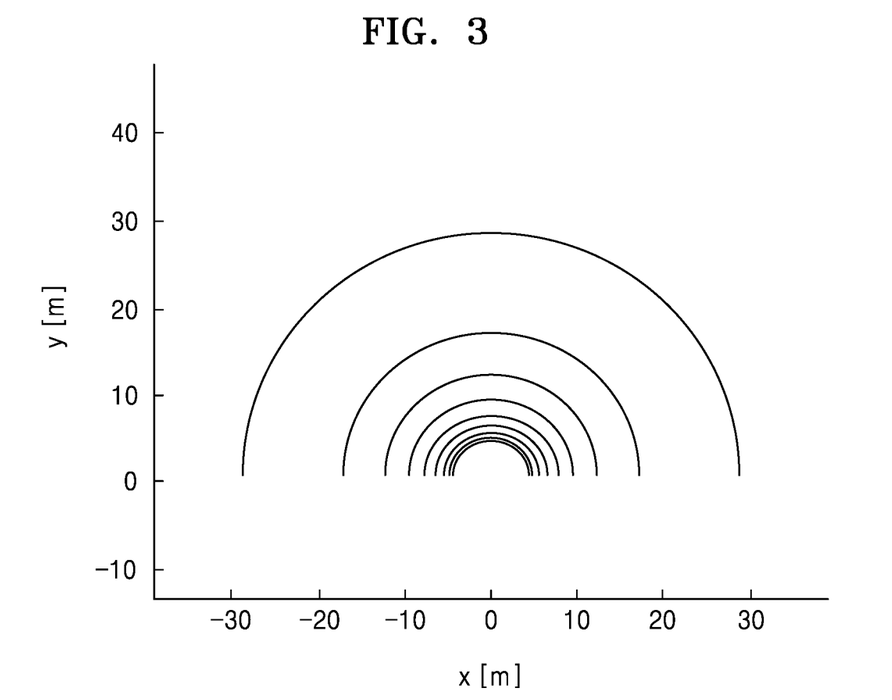
FIG. 3 is a graph showing an example of distribution characteristics of object-distance data output from a distance sensor of FIG. 2.

FIG. 3 illustrates an example of distribution characteristics of object-distance data output from the distance sensor 1012 of FIG. 2.

As described above, the distance sensor 1012 using LiDAR measures a distance by using a light reflection time. Thus, the density of data of a relative short object-distance is higher than that of data of a relatively long object-distance.

Referring to FIG. 3, as object-distances are reduced, the density of object-distance data increases. For example, the density of data about object-distances which are shorter than a predetermined object-distance, e.g., about 15 meters, is very high. Thus, an accurate interior map may be generated even when the density of data of relatively short object-distances is reduced. For example, an accurate interior map may be generated even when a preset number of pieces of data among data about object-distances which are shorter than the predetermined object-distance, e.g., 15 meters, is excluded. In addition, a communication distance between the interior exploration robot 101 and the remote control apparatus 103 may be increased.

Figure 4:
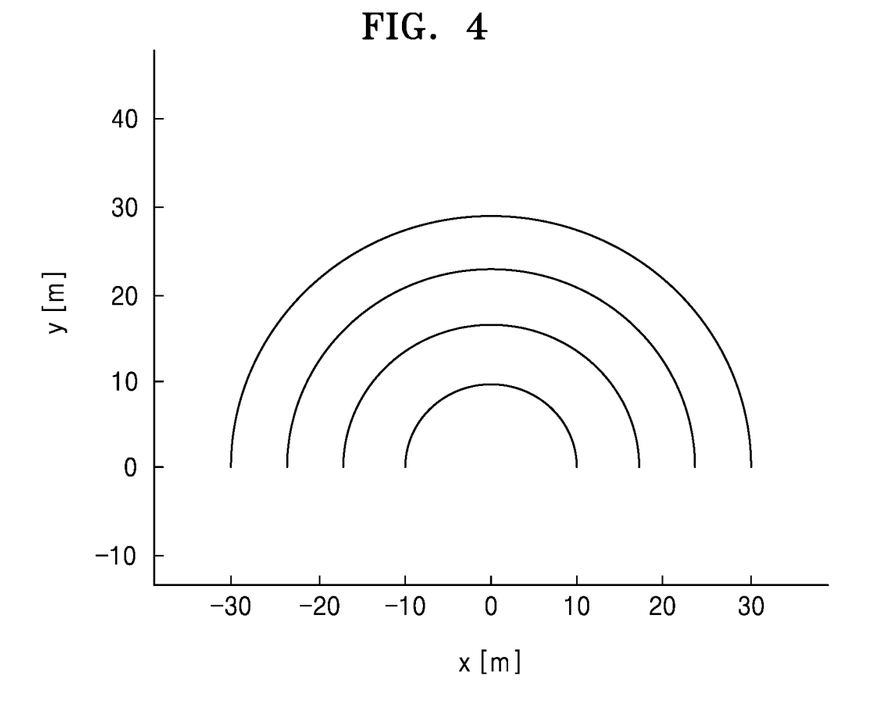
FIG. 4 is a graph showing an example of distribution characteristics of object-distance data transmitted to a remote control apparatus of FIG. 1 from the interior exploration robot.

FIG. 4 illustrates an example of distribution characteristics of object-distance data transmitted from the interior exploration robot 101 of FIG. 1 to the remote control apparatus 103 of FIG. 1.

Referring to FIG. 4, as described above, when the densities of data of relatively short object-distances are reduced, the densities of the data of the relatively short object-distances and the densities of data of relatively long object-distances become substantially the same.

Figure 5:
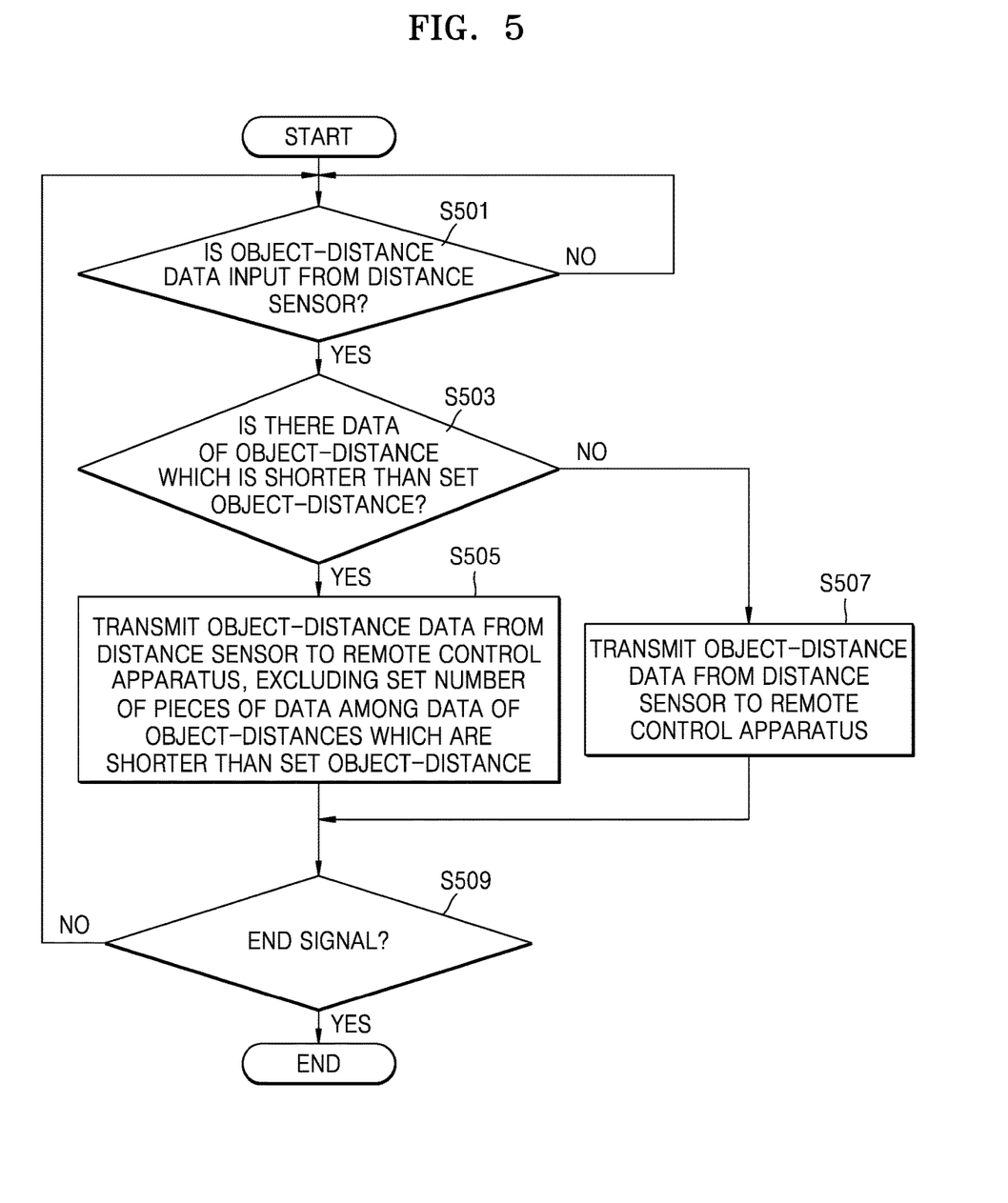
FIG. 5 is a flowchart of a process of processing object-distance data from a distance sensor of FIG. 2, performed by a processor, according to an exemplary embodiment.

FIG. 5 illustrates a process of processing object-distance data received from the distance sensor 1012 of FIG. 2, performed by the processor 1014 of FIG. 2. The process will be described with reference to FIGS. 1, 2 and 5 below.

The processor 1014 determines whether object-distance data received from the distance sensor 1012 is input thereto (S501). As described above, the distance sensor 1012 performs scanning 600,000 times per second for each of channels of different heights. Thus, a 32-channel distance sensor inputs up to 1.920 million pieces of object-distance data to the processor 1014.

When the object-distance data is input, the processor 1014 determines whether there is data about object-distances which are shorter than a predetermined object-distance, e.g., 15 meters, among the input object-distance data (operation S503).

When there is data about object-distances which are shorter than the predetermined object-distance, the processor 1014 transmits the object-distance data from the distance sensor 1012 to the remote control apparatus 103, excluding a preset number of pieces of data among the data of the object-distances which are shorter than the set object-distance (S505).

When there is no data about object-distances which are shorter than the predetermined object-distance, the processor 1014 transmits the object-distance data received from the distance sensor 1012 to the remote control apparatus 103 (S507).

Operations S501 to S507 are repeatedly performed until an end signal is generated (S509)

Figure 6:
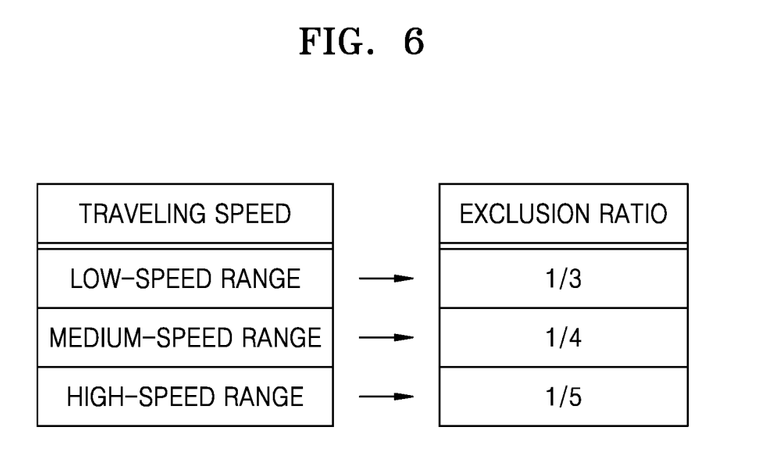
FIG. 6 is a diagram for explaining an example of operation S505 of FIG. 5.

FIG. 6 is a diagram for explaining an example of operation S505 of FIG. 5.

In the example of operation S505, an exclusion ratio which is a ratio of the number of pieces of data to be excluded to a total number of pieces of data corresponding to object-distances which are shorter than a predetermined object-distance varies according to a traveling speed of the interior exploration robot 101.

Referring to FIGS. 1, 5, and 6, a low speed range, a medium speed range, and a high speed range are set with respect to the traveling speed of the interior exploration robot 101.

When the traveling speed is in the low speed range, the exclusion ratio is a first ratio. For example, when the traveling speed is lower than 15 km/h, the exclusion ratio is 1/3.

When the traveling speed is in the middle speed range, the exclusion ratio is a second ratio which is lower than the first ratio. For example, when the traveling speed is in a range of 15 km/h to 30 km/h, the exclusion ratio is 1/4.

When the traveling speed is in the high speed range, the exclusion ratio is a third ratio which is lower than the second ratio. For example, when the traveling speed is higher than 30 km/h, the exclusion ratio is 1/5.

The density of object-distance data received from the distance sensor 1012 is inversely proportional to the traveling speed of the interior exploration robot 101. That is, the density of the object-distance data is relatively high when the traveling speed of the interior exploration robot 101 is relatively low, and is relatively low when the traveling speed of the interior exploration robot 101 is relatively high.

Accordingly, since the exclusion ratio is inversely proportional to the traveling speed of the interior exploration robot 101, a communication distance between the interior exploration robot 101 and the remote control apparatus 103 may be further increased while maintaining an accuracy of a generated interior map. That is, an interior exploration range may be further increased while generating an accurate interior map.

Figure 7:
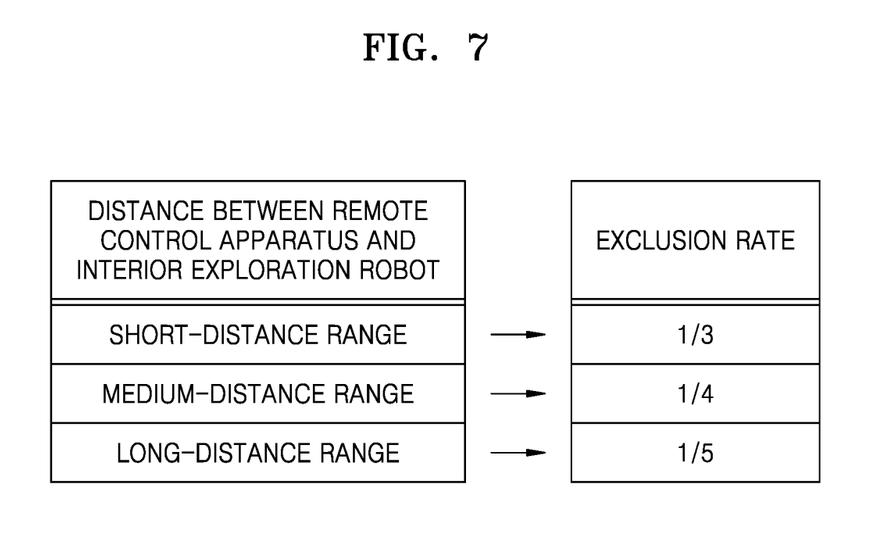
FIG. 7 is a diagram for explaining another example of operation S505 of FIG. 5.

FIG. 7 is a diagram for explaining another example of operation S505 of FIG. 5.

In the other example of operation S505, an exclusion ratio which is a ratio of the number of pieces of data to be excluded to a total number of pieces of data corresponding to object-distances which are shorter than a predetermined object-distance varies according to the distance between the remote control apparatus 103 and the interior exploration robot 101.

Referring to FIGS. 1, 5 and 7, the distance between the remote control apparatus 103 and the interior exploration robot 101 is classified into a near distance range, a middle distance range, and a far distance range.

When the distance between the remote control apparatus 103 and the interior exploration robot 101 is in the near distance range, the exclusion ratio is a first ratio, e.g., 1/3.

When the distance between the remote control apparatus 103 and the interior exploration robot 101 is in the middle distance range, the exclusion ratio is a second ratio, e.g., 1/4, which is lower than the first ratio.

When the distance between the remote control apparatus 103 and the interior exploration robot 101 is in the far distance range, the exclusion ratio is a third ratio, e.g., 1/5, which is lower than the second ratio.

A degree of smoothness of communication is inversely proportional to the distance between the remote control apparatus 103 and the interior exploration robot 101. That is, as the distance between the remote control apparatus 103 and the interior exploration robot 101 is increased, the degree of smoothness of communication decreases, and thus, the amount of lost data increases.

Thus, since the exclusion ratio is inversely proportional to the distance between the remote control apparatus 103 and the interior exploration robot 101, a communication distance between the interior exploration robot 101 and the remote control apparatus 103 may be further increased while maintaining accuracy of a generated interior map. That is, an interior exploration range may be further increased while generating an accurate interior map.

Figure 8:
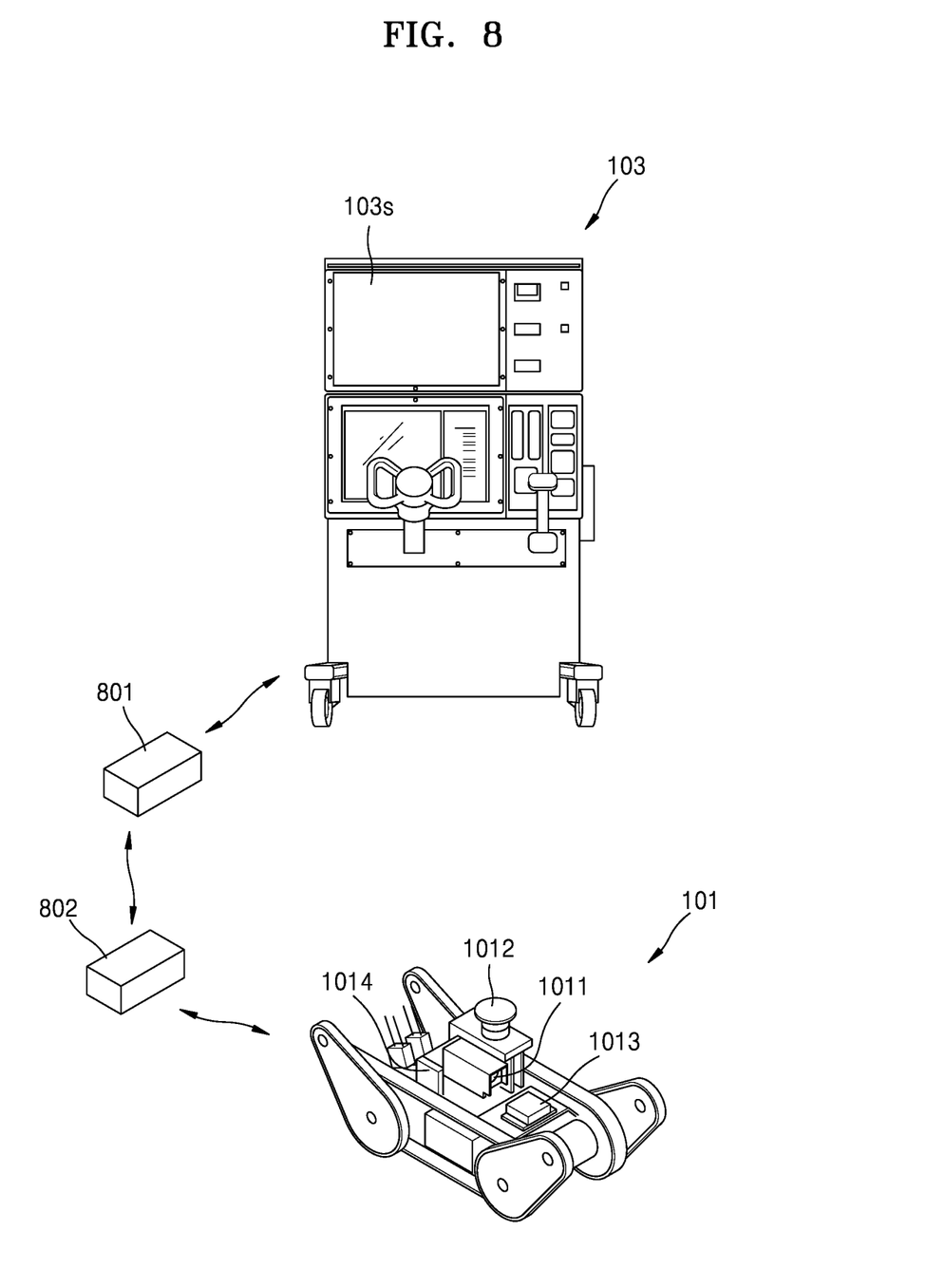
FIG. 8 is a diagram illustrating an interior-map generation system according to a second exemplary embodiment.

FIG. 8 illustrates an interior-map generation system according to a second embodiment. In FIG. 8, reference numerals that are the same as those of FIG. 1 represent components having the same functions. The above-described technical features of the interior-map generation system of the first embodiment may also apply to the second embodiment of FIG. 8. Accordingly, the interior-map generation system of the second embodiment will be described focusing on the differences from the interior-map generation system of the first embodiment.

Referring to FIG. 8, wireless repeaters 801 and 802 are installed between an interior exploration robot 101 and a remote control apparatus 103. The first wireless repeater 801 is installed between the interior exploration robot 101 and the remote control apparatus 103, and the second wireless repeater 802 is installed between the first wireless repeater 801 and the interior exploration robot 101.

In the present embodiment, the interior exploration robot 101 may install the wireless repeaters 801 and 802 in an exploration path during movement for interior exploration. For example, the interior exploration robot 101 having carried thereon magnetic bodies and the wireless repeaters 801 and 802 may install the wireless repeaters 801 and 802 by using the magnetic bodies during movement. Accordingly, a communication distance between the interior exploration robot 101 and the remote control apparatus 103 may be further increased.

Here, data transmission rates (bits/s) of the wireless repeaters 801 and 802 are differently set according to locations of the wireless repeaters 801 and 802. In the present embodiment, the data transmission rate of the first wireless repeater 801 is set to be lower than that of the second wireless repeater 802.

A data loss rate when the interior exploration robot 101 transmits object-distance data to the remote control apparatus 103 via the first wireless repeater 801 is lower than that when the interior exploration robot 101 transmits object-distance data to the remote control apparatus 103 via the second wireless repeater 802.

Accordingly, the data transmission rate of the first wireless repeater 801 may be set to be lower than that of the second wireless repeater 802, so that the communication distance between the interior exploration robot 101 and the remote control apparatus 103 may be further increased while maintaining accuracy of a generated interior map. That is, an interior exploration range may be further increased while generating an accurate interior map.

Figure 9:
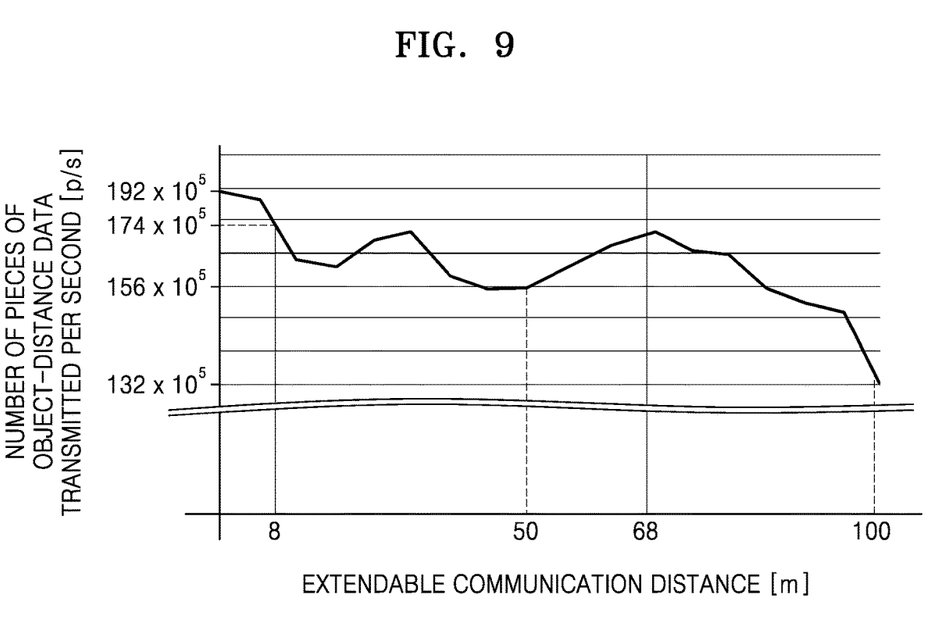
FIG. 9 is a diagram showing a result of an experiment conducted to confirm an effect of the disclosure, according to an exemplary embodiment.

FIG. 9 is a diagram showing a result of an experiment conducted to confirm an effect of the disclosure. FIG. 9 shows a result of an experiment conducted in a condition in which accuracy of a generated interior map was maintained, when the process of FIG. 5 was applied to the second embodiment of FIG. 8. In FIG. 9, an x-axis represents a communication distance between the first wireless repeater 801 and the second wireless repeater 802, and a y-axis represents the density of transmitted object-distance data, i.e., the number of pieces of object-distance data transmitted per second (points/s).

Referring to FIG. 9, as the density of the object-distance data transmitted in the process of FIG. 5 is reduced, the communication distance may be increased in a condition in which the accuracy of the generated interior map is maintained.

As described above, a distance sensor measures a distance by using a reflection time of light or radio waves. Thus, the density of data of a relatively short object-distance is higher than that of data of a relatively long object-distance. Accordingly, an accurate interior map may be generated even when the density of the data of the relatively short object-distance is reduced.

In an interior-map generation system and an interior exploration robot according to the present embodiment, object-distance data is transmitted, excluding a preset number of pieces of data among data about object-distances which are shorter than a predetermined object-distance. Accordingly, a communication distance between the interior exploration robot and a remote control apparatus may be increased while maintaining accuracy of a generated interior map. That is, an interior exploration range may be increased while generating an accurate interior map.

While exemplary embodiments have been described above, it will be apparent to those of ordinary skill in the art that various changes may be made therein without departing from essential features thereof. For example, the inventive concept may also apply to different types of map generation system using different type of robot or vehicle beyond an interior map and internal exploration robot. Accordingly, the embodiments set forth herein should be considered in a descriptive sense only and not for purposes of limitation. The scope of the disclosure is defined not in the above description but in the appended claims, and the invention defined in the claims and other inventions equivalent thereto should be understood as falling within the invention.

What is claimed is:

1. A map generation system comprising a vehicle and a remote control apparatus,
    wherein the vehicle comprises:
        a distance sensor configured to output object-distance data; and
        a processor configured to transmit to the remote control apparatus the object-distance data excluding a portion of data of object-distances which are shorter than a predetermined object-distance, and
    wherein the remote control apparatus is configured to generate a map based on the object-distance data received from the processor, and
    wherein an exclusion ratio of the portion of data to be excluded from the transmission to a total amount of the data of the object-distances which are shorter than the predetermined object-distance varies according to a traveling speed of the vehicle.

2. The system of claim 1, wherein the distance sensor is configured to output the object-distance data of different heights for each of a plurality of channels regarding each of a plurality of scan points while panning and tilting.

3. The system of claim 1, wherein the exclusion ratio is set to be inversely proportional to the traveling speed of the vehicle.

4. The system of claim 1, wherein the exclusion ratio of the portion of data to be excluded from transmission to the total amount of the data of the object-distances which are shorter than the predetermined object-distance also varies according to a distance between the remote control apparatus and the vehicle.

5. The system of claim 4, wherein the exclusion ratio is set to be inversely proportional to the distance between the remote control apparatus and the vehicle.

6. The system of claim 1, further comprising at least one wireless repeater installed between the vehicle and the remote control apparatus, and configured to relay the object-distance data transmitted from the processor to the remote control apparatus.

7. The system of claim 1, further comprising a plurality of wireless repeaters installed between the vehicle and the remote control apparatus, and configured to relay the object-distance data transmitted from the processor to the remote control apparatus at respective data transmission rates set differently according to locations of the wireless repeaters.

8. The system of claim 7, wherein a data transmission rate of a first wireless repeater which is installed closer to the remote control apparatus than a second wireless repeater, among the wireless repeaters, has a lower data transmission rate than the second wireless repeater.

9. The system of claim 6, wherein the vehicle is a robot comprising a wireless communication interface through which the processor is configured to transmit the object-distance data to the remote control apparatus.

10. A system for data gathering and transmission, the system comprising a vehicle and a remote control apparatus, wherein the vehicle comprises:
a distance sensor configured to detect object distances and output object-distance data; and
a processor configured to transmit to the remote control apparatus the object-distance data excluding a portion of data of object-distances which are shorter than a predetermined object-distance,
wherein the remote control apparatus is configured to generate a map based on the object-distance data received from the processor, and
wherein an exclusion ratio of the portion of data to be excluded from the transmission to a total amount of the data of the object-distances which are shorter than the predetermined object-distance varies according to a traveling speed of the vehicle.

11. The system of claim 10, wherein the exclusion ratio of the portion of data to be excluded from the transmission to the total amount of the data of the object-distances which are shorter than the predetermined object-distance also varies according to a distance between the remote control apparatus and the vehicle while the vehicle is being driven to detect the object-distances.

12. The system of claim 11, wherein the exclusion ratio is set to be inversely proportional to the traveling speed of the vehicle or the distance between the remote control apparatus and the vehicle while the vehicle is being driven to detect the object-distances.

13. The system of claim 10, further comprising a plurality of wireless repeaters installed between the vehicle and the remote control apparatus, and configured to relay the object-distance data transmitted from the processor to the remote control apparatus at respective data transmission rates set differently according to locations of the wireless repeaters.

14. The system of claim 13, wherein a data transmission rate of a first wireless repeater which is installed closer to the remote control apparatus than a second wireless repeater, among the wireless repeaters, has a lower data transmission rate than the second wireless repeater.

15. A robot comprising:
a distance sensor configured to detect object distances and output object-distance data;
an input/output interface; and
a processor configured to transmit, through the input/output interface, the object-distance data excluding a portion of data of object-distances which are shorter than a predetermined object-distance, to a remote control apparatus,
wherein the remote control apparatus is configured to generate a map based on the object-distance data received from the processor, and
wherein an exclusion ratio of the portion of data to be excluded from the transmission to a total amount of the data of the object-distances which are shorter than the predetermined object-distance varies according to a traveling speed of the robot.

16. The robot of claim 15, wherein the exclusion ratio of the portion of data to be excluded from the transmission to the total amount of the data of the object-distances which are shorter than the predetermined object-distance varies according to the traveling speed of the robot while the robot is being driven to detect the object-distances.

17. The robot of claim 16, wherein the exclusion ratio is set to be inversely proportional to the traveling speed of the robot while the robot is being driven to detect the object-distances.

18. The robot of claim 15, wherein the exclusion ratio of the portion of data to be excluded from the transmission to the total amount of the data of the object-distances which are shorter than the predetermined object-distance also varies according to a distance between the remote control apparatus and the robot while the robot is being driven to detect the object-distances.

19. The robot of claim 18, wherein the exclusion ratio is set to be inversely proportional to the distance between the remote control apparatus and the robot while the robot is being driven to detect the object-distances.

* * * * *